(No Model.)
C. C. DAVIS.
COFFEE POT.
No. 531,164. Patented Dec. 18, 1894.
Fig I.
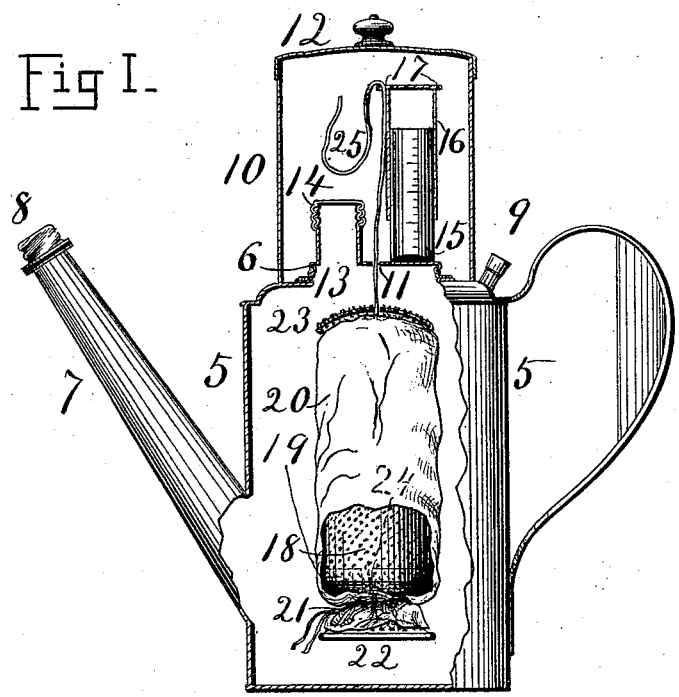
Fig II.
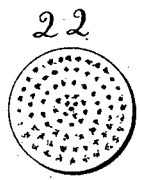
Witnesses,
P. E. Stevens.
M. C. Hillyard.
Inventor.
Charles C. Davis.
by W. L. Stevens, Atty.

UNITED STATES PATENT OFFICE.

CHARLES C. DAVIS, OF TEXARKANA, ARKANSAS.

COFFEE-POT.

SPECIFICATION forming part of Letters Patent No. 531,164, dated December 18, 1894.

Application filed July 2, 1894. Serial No. 516,284. (No model.)

*To all whom it may concern:*

Be it known, that I, CHARLES C. DAVIS, a citizen of the United States, residing at Texarkana, in the county of Miller and State of Arkansas, have invented a new and useful Improvement in Coffee-Pots; and I do hereby declare the following to be a full, clear, and exact description of the same, reference being had to the accompanying drawings, in which—

Figure I represents a coffee pot partly in vertical section and part in side elevation showing the principal features of my invention. Fig. II is a top or plan view of one of the medicators.

The object of my invention is the construction of a coffee pot so that a coffee receptacle or sack, covering, and medicators attached may be suspended in the pot at the proper distance from the bottom to secure the best results in cooking and a beverage be obtained from coffee retaining all its aroma with the healthful and invigorating qualities.

To this end my invention consists in the construction and combination of parts forming a coffee pot hereinafter described and claimed.

5 represents the body of the coffee pot provided with a screw cap or cover 6 on its top, also with a spout 7 having a screw cap or cover 8, and with an inlet 9 which may also have a screw cap or cover. All of these caps or covers are removably secured so as to be steam tight while in service, whereby the body 5 really becomes a steam boiler.

10 is a condensing chamber located on top of the boiler and normally connected therewith by a communicating opening 11 which is not more than one-sixteenth of an inch in diameter.

12 is a cap or cover for the chamber.

13 represents a large passage communicating between the boiler and chamber and it is provided with a cap 14 which may be removed.

15 is a projection rising from the cap 6 which, taken in connection with the projection around the passage 13, forms a sort of thumb screw handle by means of which the cover 6 may be screwed on or off the boiler.

16 is a cap telescopically fitted upon the projection 15 to slide up and down thereon and to cling thereto at any point where it may be left. This cap is provided with a flange 17 having many perforations through it.

18 is the receptacle in which the coffee, after being properly roasted and ground, is to be placed. This receptacle is made of thin sheet metal such as tin provided with a cover 19 and perforated with a great number of fine holes.

20 is a sack in which the receptacle is to be placed after which the mouth of the sack is to be tied with a string at 21. This sack may be made of any suitable material such as bleached or unbleached cotton that will serve the purpose of a strainer to prevent the fine particles of coffee from escaping into the solution in the process of being boiled.

22 and 23 represent what I call medicators, the first permanently attached to the lower end of the receptacle 18 by means of a wire 24; the second loosely strung upon a wire 25 by means of which wire the receptacle 18, the sack and medicators are suspended within the boiler, and to affect this suspension the wire 25 passes up through the cover 6 and through the flange 17 to which it is attached by being bent over like a hook. The receptacle should be raised about an inch from the bottom of the boiler and the distance may be seen by the gage on the standard which comprises the projection 15 and cap 16.

The operation of preparing coffee with this coffee pot is as follows: First see that everything about the coffee pot is entirely clean. Now put the required amount of coffee into the receptacle 18 and close it with cap 19, then place it within the sack 20 and tie down the mouth thereof with a string as at 21. String the medicator 23 upon the wire, pass the wire up through the opening 11 in the cap 6 and then through one of the holes in the flange 17 of the standard 16. Now place the sack containing the receptacle and coffee in the boiler thus bringing the cap 6 to its place, and by means of the projections 13 and 15 screw the cap tightly down upon the boiler. Fill the upper chamber with boiling water, then remove the cap 14 which will permit the water to descend into the boiler. Now close the passage 13 and again fill the chamber with hot water and place the coffee pot upon the fire. For some time the hot water trickles from the chamber through the hole 11 thus keeping the coffee soaking hot but not boiling. Soon after the water has all run down out of the chamber it begins to boil and the space above the water will be filled with steam and the coffee will begin to be cooked thereby. At this stage a delicate perfume begins to rise from the coffee and the true aroma of the coffee is escaping. The escape will be indicated by a whistling sound caused by the steam escaping through the small opening 11. At this time the chamber 10 should be two-thirds filled with cold water which forms a safety valve for opening 11 whereby the escaping steam will be condensed and the aroma retained. After the coffee has cooked for a sufficient length of time it should be set back from the stove and the instant the steam pressure becomes less than the weight of water in the chamber the water will run into the boiler drop by drop, trickling down the wire and retaining all the aroma which had been boiled out. The coffee may be immediately served up as a beverage, or if it is not wanted for immediate use the cover 6 should be removed and the wire 25 supporting the receptacle 18 and the sack and medicators should be withdrawn, and then the cover 6 may be returned, when the coffee may be kept hot any length of time to serve cup by cup as may be required, and the last cup full will be as perfect in flavor as the first one drawn. These medicators as well as the receptacle 18 being perforated and presenting much surface of iron to be attacked by acid will in course of time be destroyed, and they may be replaced at very little expense, while the main body of the coffee pot will wear very much longer on account of this removal of the acids.

In some cases closely fitted corks will answer as stoppers in place of screw caps and other styles of fastenings may be substituted in place of the screws of the caps without departing from my invention.

Coffee beverage thus produced, retaining all the aroma and none of the deleterious matter, has a superior flavor and it is believed to be an invigorating tonic not in any way injurious to the human system.

Having described my invention, what I believe to be new, and desire to secure by Letters Patent, is the following:

The combination in a coffee pot, of a boiler; a condensing chamber above it; a perforated coffee receptacle suspended within the boiler by a wire; a telescoping standard provided with a scale and fixed on top of the boiler and having a perforated flanged head; the said wire passing freely through an aperture in the boiler top to be connected with the said flanged head substantially as described whereby the coffee receptacle may be set within the boiler at the desired height.

In testimony whereof I affix my signature in presence of two witnesses.

CHARLES C. DAVIS.

Witnesses:
 THOMAS ROGERS,
 W. R. KELLEY, JR.